US009912731B2

(12) United States Patent
Kaushik et al.

(10) Patent No.: US 9,912,731 B2
(45) Date of Patent: Mar. 6, 2018

(54) DYNAMIC TRANSACTION COORDINATION (71) Applicant: International Business Machines Corporation, Armonk, NY (US)

(72) Inventors: Anubhuti Kaushik, New Delhi (IN); John Kurian, Bangalore (IN); Hariharan N. Venkitachalam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 14/195,916

(22) Filed: Mar. 4, 2014

(65) Prior Publication Data
US 2015/0256599 A1 Sep. 10, 2015

(51) Int. Cl.
*H04L 29/08* (2006.01)
*G06F 9/00* (2006.01)

(52) U.S. Cl.
CPC ............ *H04L 67/10* (2013.01); *G06F 9/00* (2013.01)

(58) Field of Classification Search
CPC .................................................. H04L 67/10
USPC ....................................................... 709/204
See application file for complete search history.

(56) References Cited

U.S. PATENT DOCUMENTS

| 7,505,975 | B2 | 3/2009 | Luo |
| 7,617,504 | B1 | 11/2009 | Hill et al. |
| 7,747,698 | B2 | 6/2010 | Kovachka-Dimitrova et al. |
| 7,773,979 | B1 | 8/2010 | Prasad |
| 2004/0078495 | A1 | 4/2004 | Mousseau et al. |
| 2005/0165776 | A1* | 7/2005 | Focazio ............ G06F 17/30861 |
| 2006/0122966 | A1 | 6/2006 | Fecht et al. |
| 2013/0086018 | A1* | 4/2013 | Horii ................ G06F 17/30362 |
| | | | 707/703 |
| 2014/0058939 | A1* | 2/2014 | Savla .................. G06Q 20/227 |
| | | | 705/42 |

(Continued)

FOREIGN PATENT DOCUMENTS

CN  101176068  12/2010

OTHER PUBLICATIONS

IBM, "IBM WebSphere Developer Technical Journal: Exploiting the J2EE Connector Architecture", Date: Jul. 26, 2006 (Published Aug. 4, 2004), <http://www.ibm.com/developerworks/websphere/techjournal/0607_wakelin/0607_wakelin.html#q2>.

(Continued)

*Primary Examiner* — Vivek Srivastava
*Assistant Examiner* — Sibte Bukhari
(74) *Attorney, Agent, or Firm* — Isaac J. Gooshaw (57) ABSTRACT A first computer of a distributed computing system, which is an object-oriented enterprise based application server, receives a request for a transaction. The first computer generates a unique identifier for the transaction and associates an indicator with the transaction. The indicator indicates whether coordination of transaction processing can be performed by a second computer, of the distributed computing system, that is any application server apart from an object-oriented enterprise based application server. The first computer sends the unique identifier and the indicator to the second computer which enables the second computer to participate as the coordinator for the processing of that transaction if coordination of transaction processing is permitted to be performed by the second computer.

12 Claims, 5 Drawing Sheets

(56) References Cited

U.S. PATENT DOCUMENTS

2015/0127512 A1* 5/2015 Studnitzer .............. G06Q 40/04
705/37

OTHER PUBLICATIONS

IBM, "IBM Toolbox for Java", provided by inventor in Post Disclosure comments dated Jun. 4, 2013, <http://pic.dhe.ibm.com/infocenter/iseries/v7r1m0/index.jsp?topic=%2Frzahh%2Fpage1.htm>.

IBM, "Toolbox for Java and JTOpen", provided by inventor in Post Disclosure comments dated Jun. 4, 2013, <http://www-03.ibm.com/systems/i/software/toolbox/faq.html>.

IBM, "Syncpoint flows", Last updated: Jan. 30, 2014, <http://pic.dhe.ibm.com/infocenter/cicsts/v4r2/index.jsp?topic=%2Fcom.ibm.ts.intercommunication.doc%2Ftopics%2Fdfht1c00237.html>.

IBM, "Transactional capabilities of WebSphere Adapter for SAP Software", provided by inventor in Post Disclosure comments dated Jun. 4, 2013, <http://www-01.ibm.com/support/docview.wss?uid=swg21424402>.

"Bull LiberTP—transaction processing for Java EE", BULL Architect of an Open World, provided in Main Idea of Disclosure dated Jul. 4, 2013, <http://libertp.bull.com/>.

"JTOpen: The Open Source version of the IBM Toolbox for Java", JTOpen, provided by inventor in Post Disclosure comments dated Jun. 4, 2013, <http://jt400.sourceforge.net/>.

"RFC", SAP Library—BC—Connector Framework, provided by inventor in Post Disclosure comments dated Jun. 4, 2013, <http://help.sap.com/saphelp_nwce711/helpdata/en/48/88068ad9134076e10000000a42189d/content.htm>.

"SAP Java Connector", SAP, provided by inventor in Post Disclosure comments dated Jun. 4, 2013, <http://help.sap.com/saphelp_nwce711/helpdata/en/48/70792c872c1b5ae10000000a42189c/content.htm>.

"TIBCO's Support For Java EE", TIBCO, Jun. 30, 2013, <http://www.tibco.co.in/services/standards-support/j2ee/default.jsp>.

\* cited by examiner

DYNAMIC TRANSACTION COORDINATION

BACKGROUND OF THE INVENTION

This disclosure relates generally to the field of transaction processing, and more specifically to the coordination of transaction processing in a hybrid Enterprise Information System (EIS) environment.

As application servers continue to develop, there is an increasing need to integrate Java® EE (Enterprise Edition) based applications and servers with non-Java® based applications and servers. In such situations, customers who are considering modernization or extension of traditional non-Java based applications often utilize the option of re-hosting the non-Java based application within a Java EE based application server using a Java Virtual Machine (JVM) environment. This propels the adaptation of new technologies for these non-Java applications by leveraging the features provided by the modern Java EE application server environment.

For customers who are considering modernization or extension of their systems and traditional non-Java based applications, an option of re-hosting them within Java EE application servers, based upon a JVM environment, is often available. However, such an approach becomes more complex and increasingly difficult in a cloud computing environment. Cloud computing architectures involving heterogeneous middleware environments such as a Java EE application server and traditional non-Java based application servers will have requirements for global transaction support, security, and other enterprise features across the Java and non-Java application environments. Because of the distributed nature of a global transaction, and the number of participants being involved, coordination in a global transaction can lead to significant complexities in a cloud computing environment. In addition, latency can be greatly impacted due to the many steps involved in coordination of different Enterprise Information Systems and database resources.

SUMMARY

Embodiments of the present invention disclose a method, computer program product, and system for transaction processing in a distributed computing environment. A first computer of a distributed computing system receives a request for a transaction. The first computer is an object-oriented enterprise based application server that initiates the processing of the transaction. The first computer generates a unique transaction identifier for the transaction. The first computer associates an indicator with the transaction. The indicator indicates whether coordination of the transaction processing can be performed by a second computer of the distributed computing system. The second computer is any application server apart from an object-oriented enterprise based application server. The first computer sends the unique transaction identifier and the indicator to the second computer which enables the second computer to participate as the coordinator for the processing of the transaction if coordination of transaction processing is permitted to be performed by the second computer.

DETAILED DESCRIPTION

Known solutions to integrate non-Java® based Enterprise Information System (EIS) require the EIS to implement at least one of the full XA (eXtended Architecture) standard or the Java EE Connector Architecture (JCA) based transaction contracts (or similar) for supporting global transaction. However, such implementation requires substantial changes to be made to the EIS. Such changes are often complex, time consuming, and costly.

In addition, with the increase in complexity of a hybrid system and with new developments involving non-Java EE® and Java EE applications servers, there is a pressing need for integrating Java EE and non-Java EE environments effectively. A point of difficulty can arise from the processing of transactions over such a distributed network. In such a scenario, a transaction manager typically manages the processing of a transaction. However, since there can be, and often are, multiple transaction managers deployed in the network, the coordination of transaction processing becomes more complex.

Known solutions mandate that the transaction initiator should coordinate the processing of a transaction, thereby becoming the transaction manager. As such, applications need to ensure that commit and abort commands should be issued only from the initiating transaction manager. In such solutions, other participants in the transaction should never issue commit or rollback commands. However, such a solution can lead to many restrictions on applications. For example, instead of focusing on business logic, the application has to take into account middleware infrastructure, design and its restrictions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
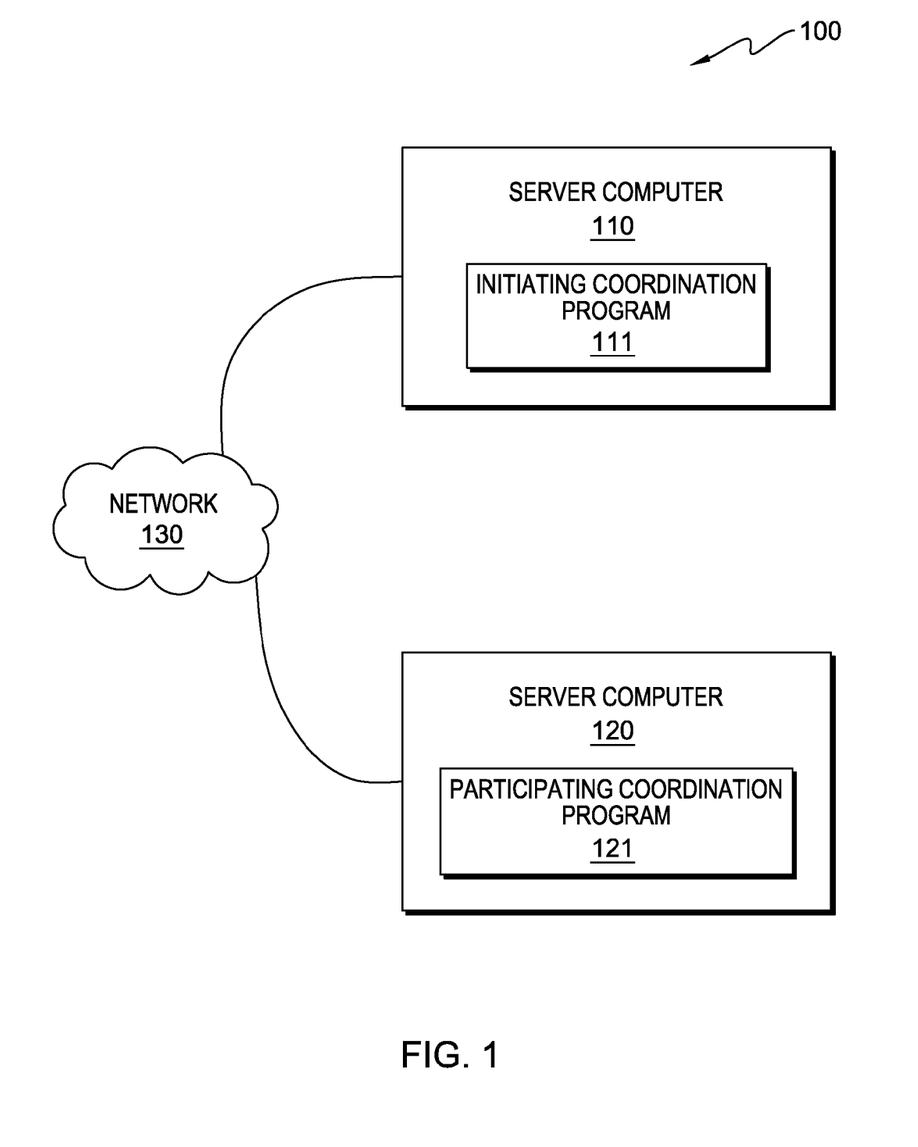
FIG. 1 is a functional block diagram illustrating a distributed computing environment, in accordance with an embodiment of the present invention.

The present invention will now be described in detail with reference to the Figures. FIG. 1 is a functional block diagram illustrating a distributed computing environment, generally designated 100, in accordance with one embodiment of the present invention. Distributed computing environment 100 includes server computer 110 and server computer 120 interconnected over network 130. In a first embodiment, server computer 110 is an object-oriented enterprise based application server, e.g., a Java® or Java EE based computing system. Conversely, server computer 120 is an application server that is not an object-oriented enterprise based application server, e.g., a non-Java or non-Java EE based computing system.

In this first embodiment, initiating coordination program 111 and participating coordination program 121 are stored on respective server computer 110 and server computer 120. However, in other embodiments, initiating coordination program 111 and participating coordination program 121 may be stored externally and accessed through a communication network, such as communication network 130. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between initiating coordination program 111, participating coordination program 121, server computer 110 and server computer 120, in accordance with a desired embodiment of the present invention.

In various embodiments of the present invention, both server computer 110 and server computer 120 can respectively be a server, a laptop computer, a tablet computer, a netbook computer, a personal computer (PC), a desktop computer, or any combination thereof. In another embodiment, server computer 110 and server computer 120 represent a computing system utilizing clustered computers and components to act as a single pool of seamless resources. In general, server computer 110 and server computer 120 can be any computing device or a combination of devices with respective access to initiating coordination program 111 and participating coordination program 121, and is capable of running initiating coordination program 111 and participating coordination program 121. Server computer 110 and server computer 120 may include internal and external hardware components, as depicted and described in further detail with respect to FIG. 5.

In various embodiments, initiating coordination program 111 associates a transaction with a flag or another form of indicator. The flag indicates whether or not dynamic coordination is allowed for that transaction. If the flag is set to indicate that dynamic coordination is allowed for that transaction, then any participant that is executing participating coordination program 121, and is participating in the processing of that transaction, can become the coordinator for that transaction. In exemplary embodiments, server computer 110 is an object-oriented enterprise based application server, e.g., a Java EE based application server. Server computer 120 is an application server that is not an object-oriented enterprise based application server, e.g., a non-Java EE based application server. In many scenarios, an application server that is not an object-oriented enterprise based application server would be unable to become the coordinator of a transaction that originated from an object-oriented enterprise based application server. However, in the following discussion, a method of providing server computer 120 with such functionality is described.

Figure 2:
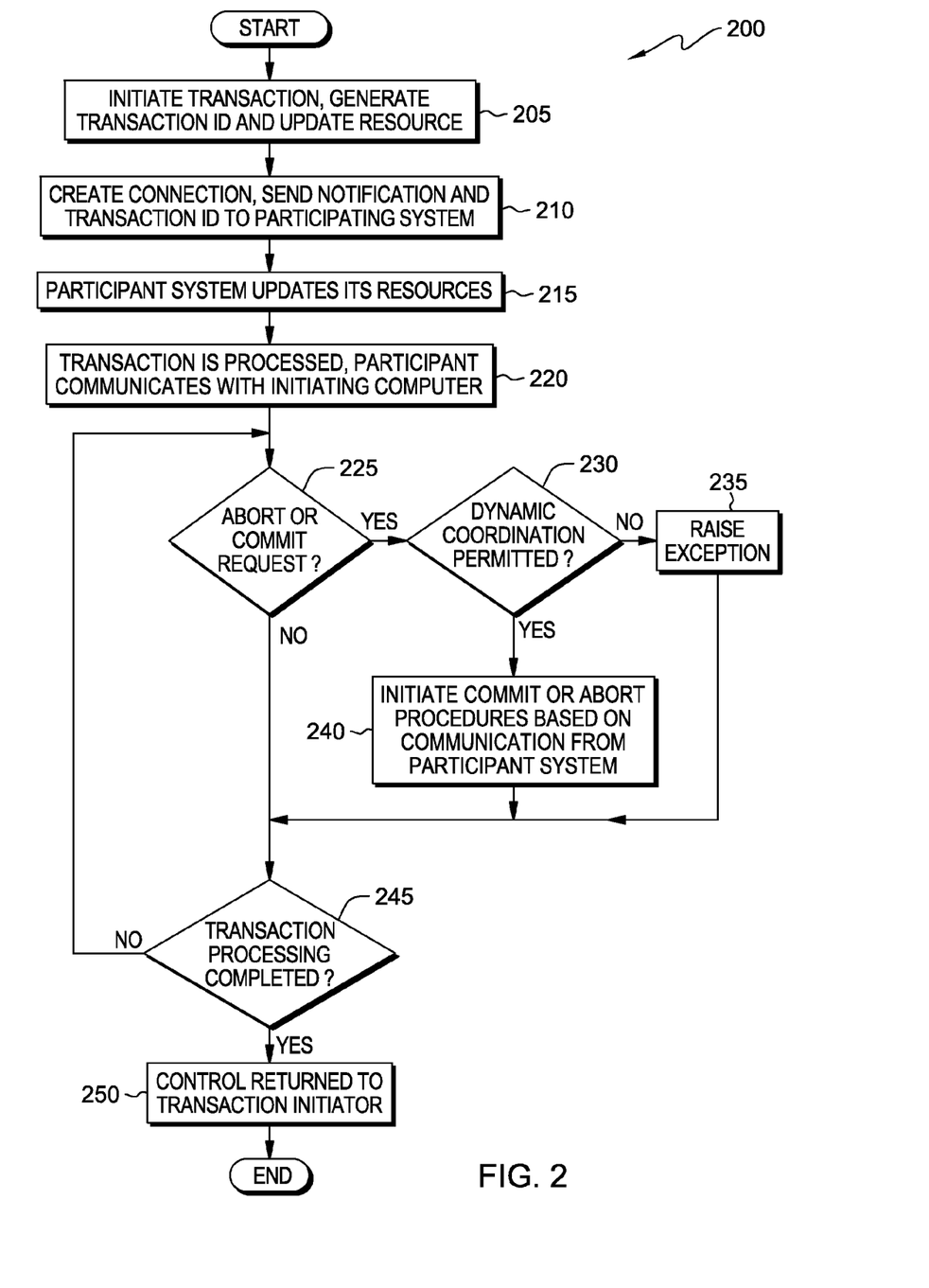
FIG. 2 shows a flowchart depicting a method for coordinating the processing of a transaction, in accordance with a first embodiment.

FIG. 2 shows a flowchart depicting a method for coordinating the processing of a transaction, in accordance with a first embodiment.

In step 205, the processing of a transaction is initiated. The transaction initiating computer system from which the transaction originates, e.g., server computer 110, generates an identifier for the transaction to be processed, i.e., a transaction identifier (ID). The transaction initiating computer system associates a flag with the transaction to indicate that dynamic coordination is allowed for that transaction. The initiating computing system updates its resources to allow for the processing of the transaction.

In step 210, the transaction initiating computing system creates communication connections with the participants that will process the transaction. Often, these are other computing systems, such as server computer 120. The transaction initiating computing system sends the transaction ID to the participants, and at least one participant is sent the transaction itself, which includes an indicator or a flag indicating that dynamic coordination is allowed for that transaction. A participant that receives the transaction itself and the associated flag indicating that dynamic coordination is allowed for that transaction and can become the coordinator for that transaction as required. The participants may update their respective resources such that the transaction can be processed, in step 215.

In step 220, the participating systems process the transaction and communicate with the initiating computer. In decision step 225, a determination is made as to whether or not any commit or abort requests (i.e., requests for a process to be initiated) have been issued by the participating systems for the transaction being processed. If a participating system issues a commit or abort request, then that indicates to the transaction initiator that the participating system that issued commit or abort call could become the coordinator for the transaction being processed. If the participating systems do not issue a commit or abort call for the transaction being processed (decision step 225, no branch), then it is determined whether or not transaction processing is complete, in decision step 245. If the participating systems do issue a commit or abort request for the transaction being processed (decision step 225, yes branch), then the transaction initiator determines whether dynamic coordination is permitted for that transaction based on whether or not the dynamic coordination flag is set, in decision step 230.

If dynamic coordination is not permitted for that transaction (decision step 230, no branch), then an exception is raised for that request, in step 235. If dynamic coordination is permitted for that transaction (decision step 230, yes branch), then commit or abort procedures are initiated based on the communication from the participant system, in step 240. In general, if the participant system detects that the dynamic coordination flag is set to indicate that dynamic coordination is allowed, then the initiating computer system, in response to the dynamic coordination flag being set, initiates commit or abort procedures based on the type of signal (commit or abort) that was received from the participant system.

If transaction processing is complete (decision step 245, yes branch) then control of transaction coordination is returned to the transaction initiating computer system, in step 250. This allows the transaction initiating computer system to process further transactions and instructions as the coordinator, or to repeat steps 205-250 as required to process new transactions. If transaction processing is not complete (decision step 245, no branch), then it is determined whether or not any commit or abort requests have been issued by the participating systems for the transaction being processed, in decision step 225.

Figure 3:
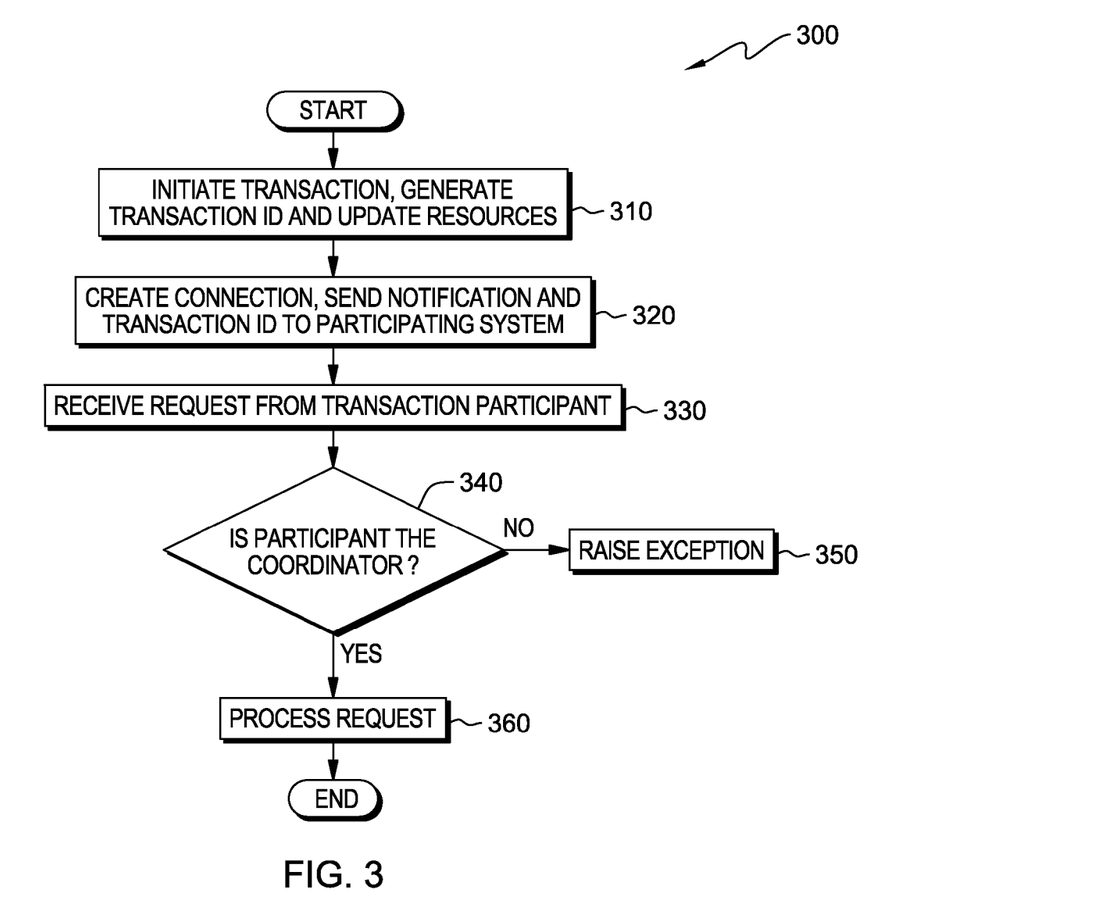
FIG. 3 is a flowchart depicting the processes of an initiating coordination program, executing on a server computer, which performs at least a part of the method steps of FIG. 2 to coordinate the processing of a transaction, in accordance with a first embodiment.

FIG. 3 is a flowchart, 300, depicting the processes of initiating coordination program 111, executing on server computer 110, which performs at least a part of the method steps of FIG. 2 to coordinate the processing of a transaction, in accordance with a first embodiment.

In process 310, initiating coordination program 111 initiates a transaction. As part of this process, initiating coordination program 111 generates a unique identification for the transaction, i.e., a transaction ID or transaction identifier. Initiating coordination program 111 associates a flag, e.g., a dynamic coordination flag, with the transaction indicating that dynamic coordination is allowed for that transaction. Initiating coordination program 111 also updates its resources, typically via a resource manager, to prepare for the processing of the transaction with whatever participants will be required.

In process 320, initiating coordination program 111 creates a connection, for communication, with the participants that will be involved with the processing of the transaction. Once the connections are established, initiating coordination program 111 sends to each of the participants the unique identification for the transaction. In addition, initiating coordination program 111 sends, to at least one participant, the transaction instructions themselves, which include the flag indicating that dynamic coordination is allowed for that transaction. The participant that receives the transaction instructions and the flag can become the coordinator for that transaction.

In process 330, initiating coordination program 111 begins receiving requests from the participants. In general there are two central requests that can be sent by the participating system, namely an abort request and/or a commit request.

In decision process 340, initiating coordination program 111 determines if the participant that sent the signal is the coordinator. In an embodiment, if any participant other than the coordinator sends a request to abort or commit the transaction, then the flag associated with the transaction in the participating system will determine if the dynamic coordination is active or not. If the dynamic coordination flag is not set to allow dynamic coordination, then initiating coordination program 111 will determine that the participant that sent the request is not the transaction coordinator. This effectively returns the duties of coordination of the transaction to server computer 110. If the participant that sent the request is not the coordinator, then initiating coordination program 111 raises an exception in process 350.

If the request did originate from the participant as a coordinator, e.g., the request includes the transaction ID and the flag indicating that dynamic coordination is allowed, then initiating coordination program 111 processes the request accordingly, in process 360. For example, initiating coordination program 111 receives a transaction ID, a flag indicating that dynamic coordination is allowed, and a commit or abort transaction request. Initiating coordination program 111 determines that the participant sending the request is the coordinator and initiates procedures to commit the transaction. In another example, initiating coordination program 111 receives a transaction ID, a flag indicating that dynamic coordination is not allowed, and a commit or abort transaction request. Initiating coordination program 111 determines that the participant sending the request is not the coordinator and raises an exception.

Figure 4:
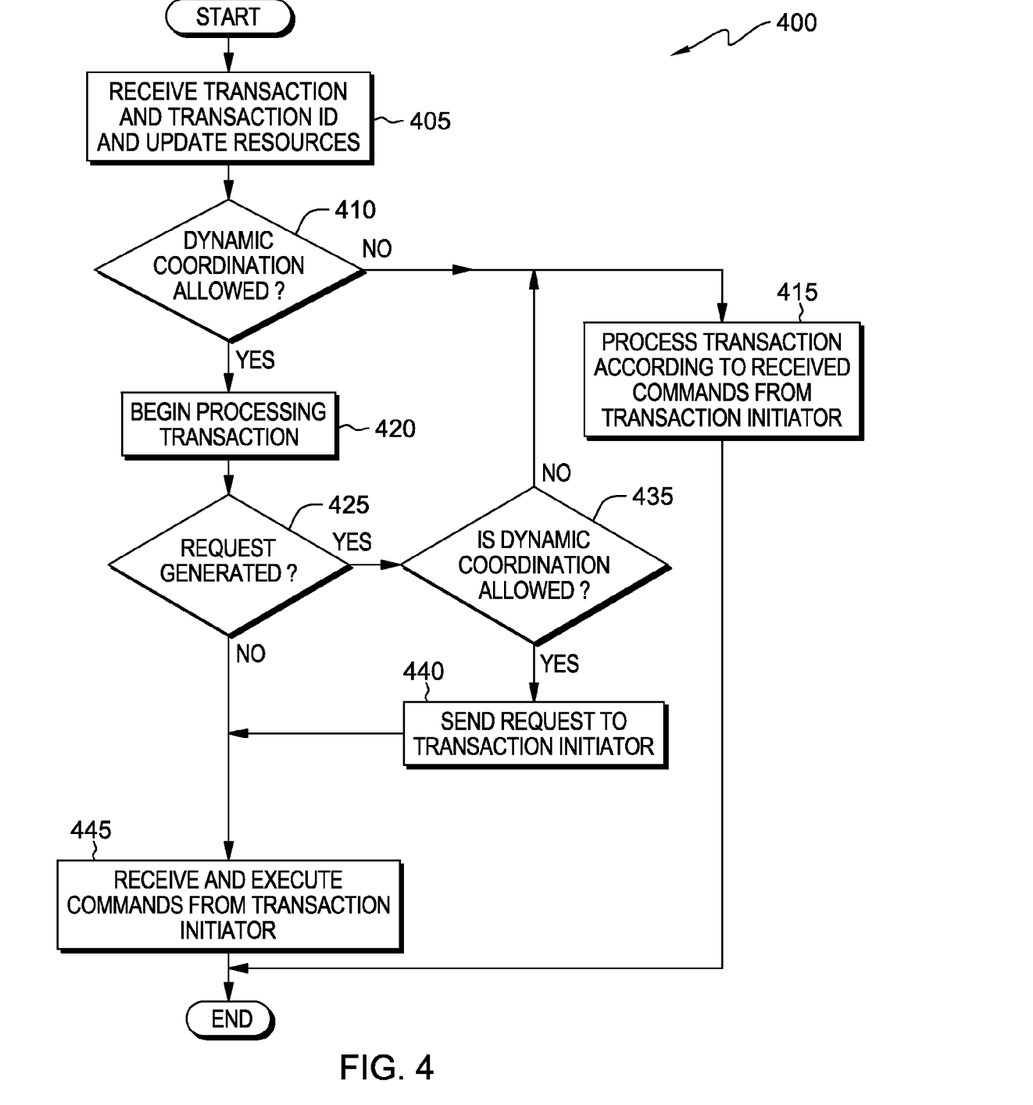
FIG. 4 is a flowchart depicting the processes of a participating coordination program, executing on a server computer, which performs at least a part of the method steps of FIG. 2 to coordinate the processing of a transaction, in accordance with a first embodiment.

FIG. 4 is a flowchart, 400, depicting the processes of participating coordination program 121, executing on server computer 120, which performs at least a part of the method steps of FIG. 2 to coordinate the processing of a transaction, in accordance with a first embodiment.

In process 405, participating coordination program 121 receives a transaction ID, the transaction instructions themselves from the transaction initiator. Participating coordination program 121 updates the resources that will be required to process the transaction.

In decision process 410, participating coordination program 121 determines if dynamic coordination is allowed for that transaction. The transaction includes a flag that indicates whether or not dynamic coordination is allowed for that transaction. If the flag associated with the transaction indicates that dynamic coordination is not allowed for that transaction (decision process 410, no branch), then participating coordination program 121 processes the transaction according to received commands from the transaction initiator. In some cases, this can include commit transaction commands. In other cases, this can include abort transaction commands. If the flag associated with the transaction indicates that dynamic coordination is allowed for that transaction (decision process 410, yes branch), then participating coordination program 121 initiates processing of the transaction as the coordinator of that transaction, in process 420.

In decision process 425, participating coordination program 121 determines if a request has been generated by the transaction processing. In some instances, a request can either activate or deactivate dynamic coordination for that transaction. If a request has not been generated by the transaction processing (decision process 425, no branch), then participating coordination program 121 proceeds to process 445. If a request has been generated by the transaction processing (decision process 425, yes branch), then participating coordination program 121 proceeds to decision process 435. In decision process 435, participating coordination program 121 determines if dynamic coordination for the transaction is allowed, i.e., whether the flag is set to enable dynamic coordination. If dynamic coordination is not allowed for the transaction (decision process 435, no branch), then participating coordination program 121 proceeds to step 415. If dynamic coordination is allowed for the transaction (decision process 435, yes branch), then participating coordination program 121 sends the request to the transaction initiator along with the transaction ID and the associated flag, in step 440.

In process 445, participating coordination program 121 receives and executes commands being received from the transaction initiator to complete the processing of the transaction.

Figure 5:
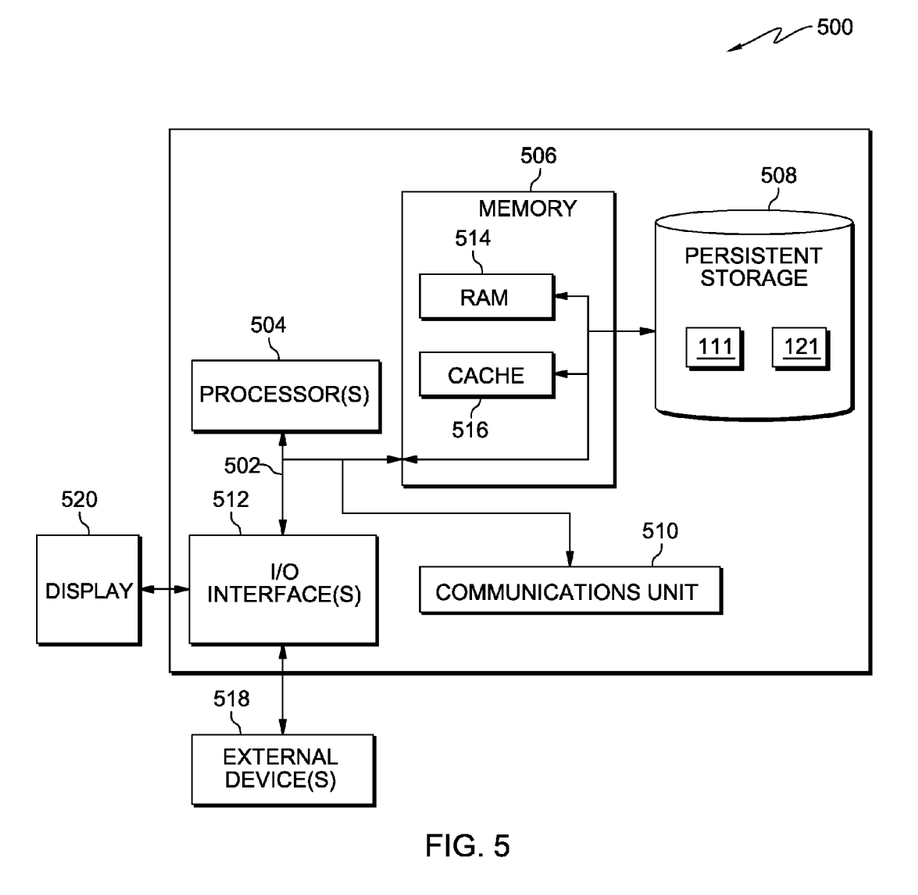
FIG. 5 depicts a block diagram of components of the server computers executing the coordination program, in accordance with a first embodiment.

FIG. 5 depicts a block diagram of respective components of server computer 110 and server computer 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 110 and server computer 120 respectively include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Initiating coordination program 111 and participating coordination program 121 are stored in respective persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information. Persistent storage 508: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 508.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of server computer 110 and server computer 120. In these examples, communications unit 510 includes one or more network interface cards. Communications unit 510 may provide communications through the use of either or both physical and wireless communications links. Initiating coordination program 111 and participating coordination program 121 may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., initiating coordination program 111 and participating coordination program 121, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Java and all Java-based trademarks and logos are trademarks or registered trademarks of Oracle and/or its affiliates. It is to be noted that the term(s) "Java", "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   receiving, by a distributed computing system, a request of processing one or more program operations, wherein (i) the request originates from an initiating computer; and (ii) the request includes an indication of dynamic coordination between at least two computers of the distributed computing system;
   sending, by the distributed computing system, one or more committal messages to the initiating computer, wherein the one or more committal messages indicate participation of the at least two computers in processing the one or more program operations included in the request;
   in response to identifying one or more committal messages associated with the at least two computers indicating a commit to processing the one or more program operations included in the request, preparing, by the distributed computing system, computing resources of the at least two computers of the distributed computing system indicating a commit to processing the one or more program operations included in the request;
   coordinating, by the distributed computing system, the processing of the one or more program operations included in the request between the at least two computers indicating a commit to processing the request;
   receiving, by the distributed computing system, a request to stop dynamic processing of the request prior to completion of the processing of the one or more program operations included in the request; and
   sending, by the distributed computing system, the request of processing one or more program operations to the initiating computer.

2. The method of claim 1, the method further comprising:
   selecting, by the distributed computing system, a first computer of the at least two computers of the distributed computing system indicating a commit to processing the request to coordinate the request.

3. The method of claim 2, the method further comprising:
   receiving, by the distributed computer system, an abort message from the first computer of the at least two computers during the coordination of the processing of the one or more program operations included in the request; and
   selecting, by the distributed computing system, a second computer of the at least two computers of the distributed computing system indicating a commit to processing the request to coordinate the request.

4. The method of claim 1, the method further comprising:
   in response to the identification of the completion of the processing of the one or more program operations included in the request, selecting, by the distributed computing system, the initiating computer to coordinate new requests.

5. A computer program product comprising:
   one or more hardware computer-readable storage media and program instructions stored on the one or more hardware computer-readable storage media, the program instructions comprising:
   program instructions to receive, by a distributed computing system, a request of processing one or more program operations, wherein (i) the request originates from an initiating computer; and (ii) the request includes an indication of dynamic coordination between at least two computers of the distributed computing system;
   program instructions to send, by the distributed computing system, one or more committal messages to the initiating computer, wherein the one or more committal messages indicate participation of the at least two computers in processing the one or more program operations included in the request;
   in response to identifying one or more committal messages associated with the at least two computers indicating a commit to processing the one or more program operations included in the request, program instructions to prepare, by the distributed computing system, computing resources of the at least two computers of the distributed computing system indicating a commit to processing the one or more program operations included in the request;

program instructions to coordinate, by the distributed computing system, the processing of the one or more program operations included in the request between the at least two computers indicating a commit to processing the request;

program instructions to receive, by the distributed computing system, a request to stop dynamic processing of the request prior to completion of the processing of the one or more program operations included in the request; and program instructions to send, by the distributed computing system, the request of processing one or more program operations to the initiating computer.

6. The computer program product of claim 5, the program instructions further comprising:

program instructions to select, by the distributed computing system, a first computer of the at least two computers of the distributed computing system indicating a commit to processing the request to coordinate the request.

7. The computer program product of claim 6, the program instructions further comprising:

program instructions to receive, by the distributed computer system, an abort message from the first computer of the at least two computers during the coordination of the processing of the one or more program operations included in the request; and program instructions to select, by the distributed computing system, a second computer of the at least two computers of the distributed computing system indicating a commit to processing the request to coordinate the request.

8. The computer program product of claim 5, the program instructions further comprising:

in response to the identification of the completion of the processing of the one or more program operations included in the request, program instructions to select, by the distributed computing system, the initiating computer to coordinate new requests.

9. A computer system comprising:

one or more computer processors;

one or more computer readable storage medium; and program instructions stored on the computer readable storage medium for execution by at least one of the one or more processors, the program instructions comprising:

program instructions to receive, by a distributed computing system, a request of processing one or more program operations, wherein (i) the request originates from an initiating computer; and (ii) the request includes an indication of dynamic coordination between at least two computers of the distributed computing system;

program instructions to send, by the distributed computing system, one or more committal messages to the initiating computer, wherein the one or more committal messages indicate participation of the at least two computers in processing the one or more program operations included in the request;

in response to identifying one or more committal messages associated with the at least two computers indicating a commit to processing the one or more program operations included in the request, program instructions to prepare, by the distributed computing system, computing resources of the at least two computers of the distributed computing system indicating a commit to processing the one or more program operations included in the request;

program instructions to coordinate, by the distributed computing system, the processing of the one or more program operations included in the request between the at least two computers indicating a commit to processing the request;

program instructions to receive, by the distributed computing system, a request to stop dynamic processing of the request prior to completion of the processing of the one or more program operations included in the request; and program instructions to send, by the distributed computing system, the request of processing one or more program operations to the initiating computer.

10. The computer system of claim 9, the program instructions further comprising:

program instructions to select, by the distributed computing system, a first computer of the at least two computers of the distributed computing system indicating a commit to processing the request to coordinate the request.

11. The computer system of claim 10, the program instructions further comprising:

program instructions to receive, by the distributed computer system, an abort message from the first computer of the at least two computers during the coordination of the processing of the one or more program operations included in the request; and program instructions to select, by the distributed computing system, a second computer of the at least two computers of the distributed computing system indicating a commit to processing the request to coordinate the request.

12. The computer system of claim 9, the program instructions further comprising:

in response to the identification of the completion of the processing of the one or more program operations included in the request, program instructions to select, by the distributed computing system, the initiating computer to coordinate new requests.

* * * * *